(12) United States Patent
Bright

(10) Patent No.: US 8,249,755 B2
(45) Date of Patent: Aug. 21, 2012

(54) PROTECTION ARRANGEMENT FOR AN ELECTRICAL POWER DISTRIBUTION NETWORK

(75) Inventor: Christopher G. Bright, Nottingham (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/003,595

(22) PCT Filed: Jul. 23, 2009

(86) PCT No.: PCT/EP2009/005342
§ 371 (c)(1),
(2), (4) Date: Jan. 11, 2011

(87) PCT Pub. No.: WO2010/015334
PCT Pub. Date: Feb. 11, 2010

(65) Prior Publication Data
US 2011/0125339 A1      May 26, 2011

(30) Foreign Application Priority Data
Aug. 5, 2008    (GB) .................................. 0814213.5

(51) Int. Cl.
*G05D 11/00* (2006.01)
(52) U.S. Cl. ........................ 700/292; 361/115
(58) Field of Classification Search .................. 700/286, 700/292, 293, 297; 361/1, 114, 115
See application file for complete search history.

(56) References Cited

U.S. PATENT DOCUMENTS

| | | | | |
|---|---|---|---|---|
| 3,539,866 A | * | 11/1970 | Stevenson | ........................ 361/44 |
| 4,937,757 A | | 6/1990 | Dougherty | |
| 2004/0130839 A1 | * | 7/2004 | Bo | .................................. 361/92 |

FOREIGN PATENT DOCUMENTS

| | | |
|---|---|---|
| DE | 2 148 581 | 4/1973 |
| EP | 1 383 217 A1 | 1/2004 |
| GB | 1 506 632 | 4/1978 |
| JP | A-2008-259342 | 10/2008 |

OTHER PUBLICATIONS

"Chapter 9 Overcurrent Protection for Phase and Earth Faults"; Jul. 11, 2005; Network Protection & Automation Guide; pp. 122-132.*

(Continued)

*Primary Examiner* — Sean Shechtman
*Assistant Examiner* — Chad Rapp
(74) *Attorney, Agent, or Firm* — Oliff & Berridge, PLC

(57) ABSTRACT

Protection arrangements and methods of operating protection arrangements are important in order to maintain operability with regard to electrical power distribution networks. Such networks generally comprise grids or meshes of electrical distribution pathways from generators and electrical loads. Faults may occur within the network and circuit breakers or other protection elements are utilised to isolate such faults. A number of regimes for protection are known but problems can arise with regard to ensuring an appropriate pan of the distribution network is isolated. By providing circuit breakers which have a time grade margin compared to other circuit breakers which is proportional to an inverse current-time logarithmic relationship between a fault electrical current divided by a major contribution electrical current to the circuit breaker operation can be achieved which is sufficiently quick for high electrical fault currents but incorporates a time delay for low electrical currents which may have a more transient nature.

21 Claims, 6 Drawing Sheets

OTHER PUBLICATIONS

Viawan, V. et al., "Protection Scheme for Meshed Distribution Systems with High Penetration of Distributed Generation," *Power Systems Conference: Advanced Metering, Protection, Control, Communication, and Distribution Resources*, Mar. 1, 2006, pp. 99-104.

Orduña, E. et al., "Algorithmic-Knowledge-Based Adaptive Coordination in Transmission Protection," *IEEE Transactions on Power Delivery*, Jan. 2003, pp. 61-65, vol. 18, No. 1.

British Search Report issued in British Application No. GB0814213.5 on Nov. 26, 2008.

International Search Report issued in International Application No. PCT/EP2009/005342 on Oct. 20, 2009.

Written Opinion of the International Searching Authority issued in International Application No. PCT/EP2009/005342 on Oct. 20, 2009.

* cited by examiner

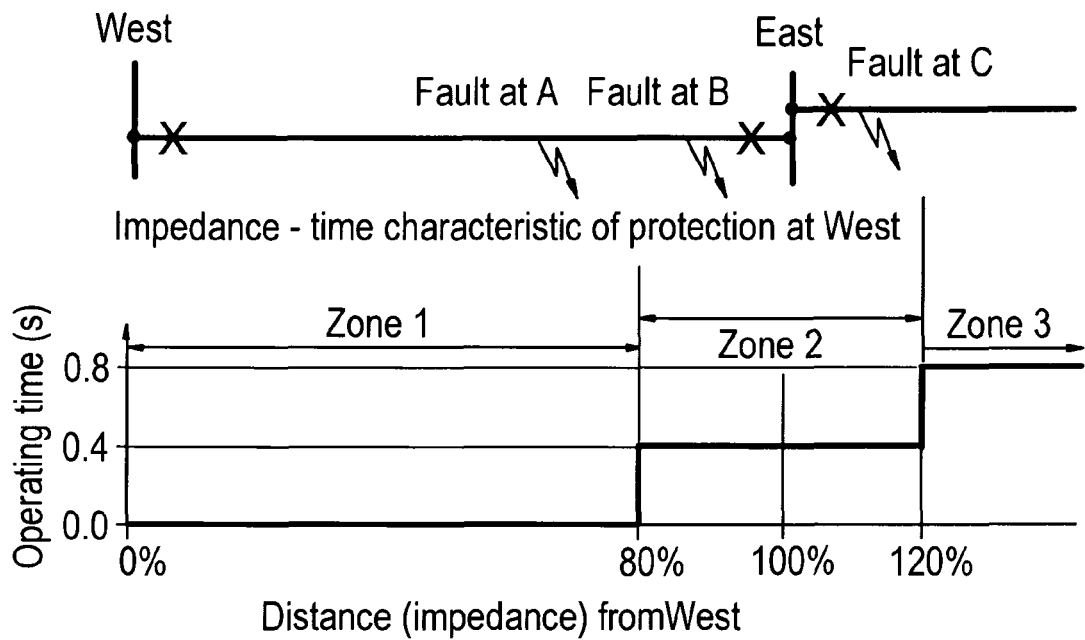
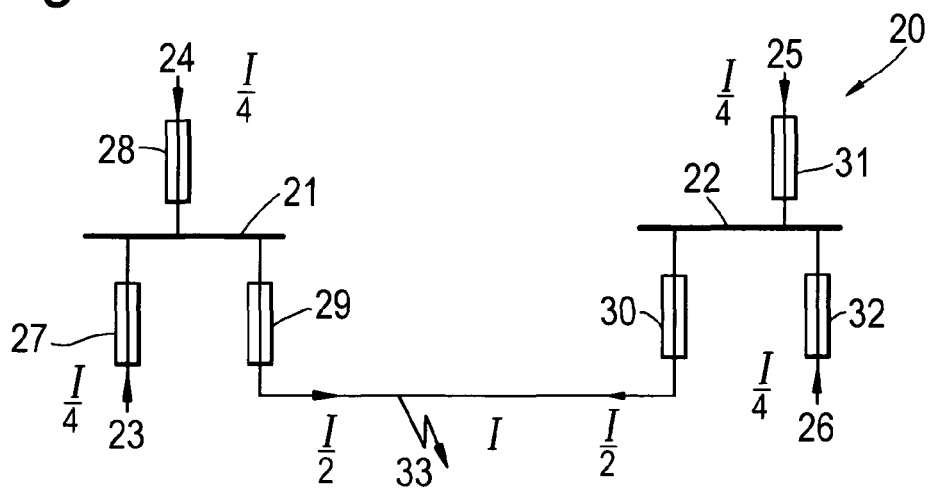

PROTECTION ARRANGEMENT FOR AN ELECTRICAL POWER DISTRIBUTION NETWORK

The present invention relates to protection arrangements and methods of operating such protection arrangements particularly with regard to electrical power distribution network configured in a mesh of interconnected generators and loads through junctions to distribution elements.

Traditionally electrical distribution systems have been based upon radial or linear supply circuits which radiate from a source of supply such as a power station or a substation. It will be appreciated that such radial supply networks are vulnerable to loss of a radial circuit at a high position in the distribution network or arrangement. In such circumstances even though lower levels of the radial distribution arrangement may be able to operate acceptably as there are no alternative sources of supply such elements within the distribution network cannot function. An alternative is to provide a meshed or grid power distribution arrangement so that there are a number of electrical power supplies to any point or junction and therefore there is an improved reliability of electrical supplies. Such power distribution arrangements are formed by connecting together radial circuits so that customers enjoy the security provided by two or more alternative supplies operating in parallel. Unfortunately, meshed power distribution networks require more sophisticated protection for safety and reliability of operation.

A number of forms of protection arrangement are known. A review of such prior protection arrangements is provided below but none is ideal and has limitations.

One approach to protection is to provide an earth fault protection arrangement. Earth faults occur as a result of a variety of causes such as failure of electrical insulation or an earthed object such as a tree branch falling upon a live conductor. Such earth faults present electrical shock and burn hazards. In such circumstances earth fault protection arrangements must be able to isolate and act quickly. Generally an earth fault protection arrangement utilises a relay which measures earth fault current and thereupon makes a logical decision whether to trip the earth fault protection, that is to say isolate a part of the distribution arrangement. Typically an earth fault protection arrangement will include a core balance transformer (CT) which generally acts about all three phases of a three phase power supply system. In normal operation it will be appreciated the sum of all the phase currents is zero. However, if there is an earth fault current in one phase then some of that current flows to earth instead of back through the other two phases resulting in a sum which is no longer zero and which can be utilised as an indicator to trip a fault protection arrangement. A disadvantage with such fault protection arrangements is that the core balance transformer must enclose all three phases and this may be difficult in some circumstances. An alternative to a core balance transformer approach is to utilise a residual connection. In such circumstances the current transformers are residually connected to provide a current to operate an earth fault protection arrangement. Thus, an individual transformer is provided for each phase and through an appropriate logic a consideration made with regard to whether the protection arrangement should be tripped.

It will be understood in some circumstances it is necessary to detect high resistance earth faults which may not be detected by ordinary earth fault arrangements. For example a live conductor as part of an overhead electrical power line may break and fall onto a tree or hedge. In such circumstances there is a high resistance contact with earth and the electrical current which flows will be small or at least too small to operate ordinary earth protection arrangements.

Sensitive earth protection arrangements detect high resistance faults and typically are connected in series with ordinary earth fault protection arrangements. Sensitive earth fault protection arrangements are set to have a low current setting typically in the order of 3% of the core balance transformer fault current. In such circumstances low currents are detected which are produced by high resistance faults and the protection arrangement is tripped if that low current persists for a set time period typically of at least five seconds. This time period is chosen because in such circumstances transient currents which can be expected in normal and also abnormal operation can be ignored since such transient currents normally last less than three seconds reducing the prospects for nuisance tripping of the protection arrangement.

It will also be understood that sensitive earth protection arrangements are typically applied to radial distribution systems in a time graded regime with tapering away from a generating source. In such circumstances using the principles of low current and time grading regimes it is possible to ensure that the protection arrangement trips nearest the fault rather than at a protection junction presented by a circuit breaker further from the fault. Time grading allows protection nearer to the fault to operate quicker than protection further away.

A further approach to protection arrangements is to provide so-called unit protection in which protection is applied to individual protected zones. In such circumstances electrical faults, that is to say fault currents flowing through a protected zone are considered in terms of flow direction. The electrical current flow at each end of the protected zone should be in the same direction. However, when a fault is located within a protected zone then it will be appreciated that electrical current at each end of the protected zone will flow in opposite directions, that is to say from separate electrical sources or junction connections to the power distribution arrangement. In such circumstances if the circuit breaker elements are in communication with each other then the protection arrangement can compare the direction of electrical current flow and so decide to operate or restrain operation within a protected zone. Thus the protection arrangement identifies unambiguously which protection zone includes the fault and enables operation of one or more circuit breakers appropriately and instantaneously to isolate that fault whilst the remainder of the distribution arrangement remains operational.

A further approach to protection arrangements in electrical power distribution systems is to provide so-called distance protection. In such arrangements the impedance of a protected circuit is measured in terms of electrical current and voltage. If a fault occurs then the measured impedance will reduce and if the fault has an impedance which is low compared to the impedance of the phase conductors then the measured impedance will be proportional to the distance to the fault. Such considerations of distance will allow determinations as to whether the fault is within a protected zone for which a circuit breaker should be tripped or whether the fault is outside the protected zone. FIG. 1 provides a schematic illustration of a radial section from a power distribution network or arrangement and considerations of operating time against distance from a substation such as West. It will be seen that the distance protection arrangement is installed between substations East and West. The protection has three zones corresponding to ranges of impedance. Instantaneous operation occurs for faults within zone 1. Measurement errors prevent zone 1 being set to cover only the protected circuit and no more. In such circumstances zone 1 will typically be set to 80% of the impedance of the protected circuit or zone and operation is instantaneous for a fault such as that at A well within zone 1. Zone 2 covers the remainder of the protected circuit or zone plus some distance into neighbouring circuits. In such circumstances circuit breakers for this second zone will be set with a time delay of 400 ms. Zone 3 is set beyond zone 2 and has a time delay of in the order of 800 ms for its circuit breakers. Zone 2 and zone 3 offer back up protection for neighbouring circuits. Thus for example, a fault at C would normally be cleared by zone 1 protection at East but if that protection arrangement in terms of a circuit breaker should fail then zone 2 protection at West would clear fault C instead.

It will be understood that most faults in a protected circuit would be in zone 1 of both ends of the protected circuit and the protection at each end would trip appropriate circuit breakers at each end instantaneously. Faults close to one end would be in zone 2 nearer to one end and the circuit breaker at that end would be tripped in about 400 ms. This time could be reduced by appropriate reconfiguration.

Discrimination by a distance protection regime is improved by providing directional elements which measure the product of system voltage and fault current to determine the direction of power flow so that protection only responds by tripping circuit breakers if a fault current is in a particular direction. For example with regard to FIG. 1 directional protection installed at East within the East West electrical protection zone would respond to faults at A and B but not at C.

As indicated above each of the above protection processes have problems. With regard to unit or zone protection although having the capability of responding to high resistance earth faults this approach requires communication between each end of a protected zone to operate effectively. This may be acceptable within high voltage transmission circuits but typically the cost would not be justified in low voltage distribution arrangements. It will also be understood that the presence of unbalanced phase to earth capacitance currents can effect the comparison between the current flows at each end of the protected circuit. Distance protection is generally not suitable for sensitive earth fault protection since the impedance of high resistance faults typical of earth fault protection would be greater than the impedance of the phase conductors of the protected circuit. The impedance of a fault typically dominates the measurements and so measured impedance would not vary greatly dependent upon the position of the fault and consequently the distance to the fault would be difficult to determine accurately. With regard to sensitive earth protection arrangements generally the protection characteristics will define time delay whereby above the current setting of the delay the operating time is constant regardless of the fault current. However such an appropriate means a current time gradient cannot be used since there is no variation in the operating time for changes in the fault current. This means that a current to time grading regime cannot be used since there is no variation in the operating time for fault current level with a high fault current requiring a more rapid response.

In accordance with aspects of the present invention there is provided a protection arrangement for an electrical power distribution network, the arrangement comprising a plurality of circuit breakers arranged at junctions within the distribution network, at least one of the circuit breakers is arranged to trip with a time grading margin proportional to a logarithm of a fault electrical current divided by a major contributory current presented to the circuit breaker, the time grading margin is given by the expression $\Delta t = G \ln (I_f \div I_m)$, where $\Delta t$=the time grading margin, G is a grading constant, $I_f$ is the fault current and $I_m$ is the major contributing current.

Also in accordance with aspects of the present invention there is provided a method of operating a protection arrangement for an electrical power distribution network, the method comprising configuring a plurality of circuit breaker elements at junctions within the distribution arrangement, arranging for at least one of the circuit breakers to trip with a time grading margin proportional to a logarithm of a fault electrical current divided by a major contributory current presented to the circuit breaker, the time grading margin will be given by the expression $\Delta t = G \ln (I_f \div I_m)$, where $\Delta t$=the time grading margin, G is a grading constant, $I_f$ is the fault current and $I_m$ is the major contributing current.

This method relies upon a circuit breaker nearer a fault carrying more fault current than circuit breakers further away from the fault. This will be the pattern of fault current flow in a meshed electrical power distribution network. At a substation containing several circuit breakers, the circuit breaker nearer the fault than the other circuit breakers at that substation will carry the greater fault load. The current flowing through the circuit breaker carrying the greater current is termed $I_f$. The other circuit breakers will carry less current because each of the other circuit breakers are contributing to the fault current carried by the circuit breaker nearer to the fault, instead of carrying the whole of the fault current. The operating times of the circuit breakers carrying the currents contributing to the total fault current should be longer than the operating time of the circuit breaker nearer to the fault so that the circuit breaker nearer to the fault should operate instead of any other circuit breaker at that substation. If the circuit breaker nearer the fault fails to operate, circuit breakers further away should operate instead, after time delays according to the grading margins that would depend upon the fault current flowing through each circuit breaker.

As stated previously, at a substation containing several circuit breakers, a circuit breaker nearer a fault will carry more fault current than other circuit breakers at that substation. Those other circuit breakers that are further away from the fault will contribute to the fault current. One of these contributions to the fault current will be greater than all the other contributions and this contribution is termed the major contribution to fault current and is termed $I_m$.

The inverse current-time logarithmic characteristic is based on the time grading margin between the operating time of a circuit breaker carrying fault current $I_f$ and the operating time of a circuit breaker carrying the major contribution to the fault current $I_m$ being proportional to the logarithm of the ratio between the fault current If and the major contribution to the fault current $I_m$.

$\Delta t$ is a time grading margin setting that may be entered manually or remotely by a supervisory control and data acquisition system (SCADA). It is a difference between the operating time of a circuit breaker through which the fault current If flows and the operating time of an adjacent circuit breaker through which the major contributing current $I_m$ flows.

Possibly, the time grading constant is variable and/or adjustable dependent upon operational requirements.

Similarly, G is a grading constant that may be entered manually or remotely by the supervisory control and data acquisition system (SCADA).

Possibly, the grading constant G is variable and/or adjustable dependent upon operational requirements.

If is the fault current carried by the circuit breaker nearer the fault. $I_m$, the major contribution to the fault current is not a protection setting nor is it a quantity that has to be communicated to other circuit breakers. Instead, $I_m$ is a mathematical concept used to derive the inverse current-time logarithmic characteristic.

Generally, a minimum time delay is provided with regard to operation of a respective circuit breaker. Generally the minimum time delay is to avoid excessive damage to the distribution arrangement. Generally the minimum time delay is determined relative to a high fault current value.

Generally, a maximum operating time for the circuit breaker is determined relative to a minimum fault current to avoid spurious operation of the circuit breaker due to transient values, and to allow the circuit breaker with the minimum operating time to operate in response to nearby faults instead of other circuit breakers.

Possibly, the circuit breakers incorporate auto re-closure.

Generally, circuit breakers within the power distribution network are arranged such that circuit breakers in a radial sequence through the electrical power distribution network are graded such that the current setting of an upstream protective device is at least 1.3 times that of the current setting of the protective device immediately downstream.

Typically, any auto re-closure is a single one shot auto re-closure. Alternatively, the auto re-closure is a multiple shot auto re-closure.

Generally a controller is provided to control operation of the circuit breaker elements. Typically, the circuit breaker elements incorporate signal pathways to the controller to allow determination of status by the controller. The controller is configured to set the circuit breakers for re-closure.

Aspects of the present invention will now be described by way of example only with reference to the accompanying drawings in which:

FIG. 1 provides a schematic illustration of a radial section from a power distribution network or arrangement and consideration of operating time against distance from a substation.

FIG. 2 provides a schematic illustration of an over current protection arrangement for a low voltage part of an electrical power distribution arrangement;

FIG. 3 provides a schematic illustration of a part of an electrical power distribution arrangement in accordance with aspects of the present invention;

Figure 3:
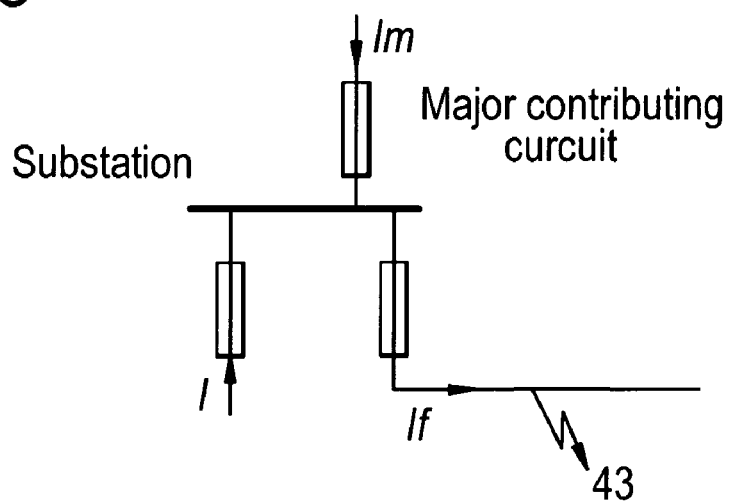

Aspects of the present invention relate to consideration of a power distribution network in terms of division of electrical current at junctions within the network and operation of protection devices in the form of circuit breaker elements with the same characteristics. FIG. 2 provides a schematic illustration of a low voltage part of a power distribution network 20. The network 20 comprises power buses 21, 22 to which electrical power sources or loads 23, 24, 25, 26 are secured. Each of these sources or loads 23 to 26 are associated with the network 20 through protection elements in the form of fuses 27, 28, 29, 30, 31, 32. In FIG. 2 a fault 33 is presented between fuses 29, 30.

It is a principle of aspects of the present invention that the fuses 29, 30 nearest the fault 33 will carry the greatest electrical current whilst those fuses 27, 28, 31, further away will carry the least electrical current. Thus the fault current is divided amongst circuits supplying the fault current. By consideration of the fault current and its proportioning, operation of fuses 29, 30 nearest to the fault 33 will occur assuming that all protection arrangements in the form of circuit breakers or fuses have the same characteristics.

In view of the above it will be understood that aspects of the present invention require that the fuses or circuit breakers 27 to 32 have the same operating characteristics where the operating times vary inversely with current. It is known to provide such characteristics for example with regard to inverse definite minimum time (IDMT) characteristics which include SI (standard inverse), VI (very inverse), EI (extremely inverse) and LTI (long time inverse). Unfortunately as explained below existing inverse definition minimum time (IDMT) characteristics are unacceptable with regard to protection arrangements.

IDMT characteristics are unsuitable because of the wide range of potential electrical earth fault currents that may be met in practice. For example:

a) The lowest earth fault current that can be measured is about 0.03 multiplied by the current transformer primary current. The limit being set by unbalanced capacitance to earth which will create transients and spurious results. In such circumstances as indicated above generally a time delay is provided to ensure that there is consistency of the fault current over that time period before tripping protection arrangements. An acceptable period is generally arbitrary but typically 20 seconds is utilised although operationally an operating time of less than 20 second will avoid potential problems of undue electric shock hazard and fire risk.

b) The highest earth current will typically be considered at twenty times the current transformer primary current. Above this magnitude of fault current the transformer will saturate limiting the secondary current from the transformer. For isolation of faults in such circumstances the operating time should be no more than 0.4 seconds.

c) In view of the above satisfactory performance with IDMT characteristics it is required that the range of earth fault currents are from 0.03 to 20 times the current transformer primary current giving a ratio in the order of 667:1.

In the above circumstances generally a fault current setting will be determined above which the circuit breaker will operate. A response characteristic will be determined in which there is a time multiplier. This time multiplier is arranged to exaggerate response time and typically lower it, for higher fault currents. A typical time multiplier would be 0.52 such that with such a time multiplier fault currents between 1 and 20 times the rated fault current would result in an operating time variation in the order of 1 second to 0.52 seconds. There is a difference of only 0.5 seconds despite a twenty fold change in the fault current. Such a small change in the operating time for such a large change in fault current would defeat any attempt to provide time current discrimination in a protection arrangement as described above.

Aspects of the present invention configure the circuit breaker element to have a characteristic which is a logarithmic characteristic in which operating time varies inversely with current. This inverse current-time logarithmic characteristic would provide better discrimination for the earth fault currents outlined above with respect to IDTM characteristics under factors a) to c).

In accordance with aspects of the present invention the time current characteristic is derived by combining the requirements for time grading with requirements for current grading. Referring to FIG. 3 electrical current grading is achieved by ensuring that successive relays have current settings in the ratio of at least 1.3:1. In such circumstances the fault current and the relay trigger or setting current in a radial series are themselves in a ratio of at least 1.3:1. Furthermore, within a power distribution network successive circuit breakers in a radial path are arranged to have a time grading margin of at least 0.4 seconds or whatever operating time is considered appropriate for successive relays through a potential fault path in a power distribution arrangement. The electrical current ratios and time grading margins utilised will make allowance for relay and current transformer measurement inaccuracies and variations in potential operating times with regard to protection and switch gear such as circuit breaker elements.

The electrical current grading and time grading margins are used in providing a protection arrangement for an electrical power distribution system. Each substation is considered to have several electrical circuits or protection zones as illustrated in FIG. 3. If one of these protection zones or circuits suffers an electrical fault 43 then the other electrical protection zones or circuits will contribute to the electrical fault current. These contributions may vary according to power distribution network conditions but under most conditions one protection circuit will contribute more fault current than other circuits. The circuit that contributes the most fault current $I_f$ is termed the major contributing circuit and the fault current that flows through that circuit is termed the $I_m$ (major contribution fault current).

The ratio of the fault current $I_f$ to the major contribution fault current $I_m$ is termed the fault current ratio C. This can be represented by the expression $$C = I_f \div I_m \quad \text{Expression (1)}$$

The ratio is similar to the electrical current grading value used previously with regard simple traditional radial distribution systems. There is also a requirement for adjacent protection devices typically in the form of circuit breakers to have differentials in their operating time. These differentials can be termed time grading margin $\Delta t$. Typically the time grading margin will be in the order of 400 ms to avoid spurious operation of an upstream protective device, such as a circuit breaker, instead of a downstream device.

The electrical current ratio and time grading margin can be combined in a mathematical equation which produces a certain time grading margin for a certain electrical current ratio. This expression can be defined as $$\Delta t = G \ln C \quad \text{Expression (2)}$$

The term G is the grading constant. Which can be calculated by the expression:

$$G = \Delta t \div \ln C \quad \text{Expression (3)}$$

In accordance with aspects of the present invention the expression 3 above is used to define a time grading margin which has a characteristic in the form of an inverse current-time logarithmic relationship. The time grading margin $\Delta t$ is proportional to the logarithm of the ratio between the fault current and the major contribution to the fault current.

It will be understood with regard to the behaviour of a protection arrangement consideration must be given to protection arrangements closest to the maximum prospective fault current $I_p$ since this operating time determines the grading with respect to neighbouring protection. Such a protection characteristic can be considered a high set feature and is analogous to existing protection arrangements in which $T_h$ is the operating time for the high fault current setting $I_h$. In such circumstances the operating time T of a circuit breaker for a given fault current flowing through that circuit breaker is determined by using expressions (1) to (3) to yield the expression 4 below:

$$T = T_h + (\Delta t \div \ln C) \times \ln(I_h \div I_f) \quad \text{Expression (4)}$$

By the above expression three main features are achieved by defining the protection characteristic appropriately. Firstly, the operating time decreases with increasing electrical fault current. Secondly, a constant time grading margin is achieved between two adjacent circuits which carry different amounts of current that are in the ratio C. This ensures that the circuit breaker nearest the fault operates instead of circuit breakers further from the fault, since circuit breakers nearer the fault will carry more current than those circuit breakers further from the fault. Thirdly, the inverse current-time logarithmic characteristic is convex when plotted on protection grading diagrams, whereas prior art protection characteristics such as standard inverse, very inverse, extremely inverse, long time inverse, and also protection characteristics described in DE2148581A, EP1383217A1 and U.S. Pat. No. 4,937,757 are concave. The reason for this difference is believed to be that prior art protection characteristics have been developed to particularly suite radial electrical networks, whereas the inverse current-time logarithmic characteristic has been developed to particularly suite meshed electrical networks.

It is also important to consider a relay or protection arrangement pick up current setting $I_s$. Below the current $I_s$ the protection arrangement in the form of a circuit breaker must not operate. Therefore a circuit breaker using the inverse current-time logarithmic characteristic for time grading as indicated above needs to override that characteristic at electrical fault currents below a pick up electrical current setting. The protection arrangement will have settings for operation determined by requirements which relate to circuit breaker operating current setting $I_s$, high fault current $I_h$, operating time $T_h$ at the high electrical fault current $I_h$, the current ratio C as defined above and the time grading margin $\Delta t$.

In view of the above it is important to consider the operating time $T_s$ at the stand by or pick up fault current $I_s$. This time $T_s$ is determined from the above values $I_s$, $I_h$, $T_h$, C and $\Delta t$ by substituting $I_s$ for $I_f$ in expression (4) to yield expression (5) below:

$$T_s = T_h + (\Delta t \div \ln C) \times \ln(I_h \div I_s) \quad \text{Expression (5)}$$

For illustration purposes an example of operation of a protection arrangement in a number of aspects will now be described with reference to associated drawings.

In order to provide acceptable performance with regard to a protection arrangement in a power distribution network consideration of a prospective earth fault current in the order of 20 times the current transformer primary current must be considered. The electrical protection must operate quickly for such a large fault current. Also there must be consideration of an earth fault current that may only be 3% of the current transformer primary current. The electrical protection can operate more slowly for such a current. The protection arrangement will therefore be set such that:
a) $I_s$=0.03×the current transformer current in the protection arrangement (circuit breaker).
b) $I_h$=20 times the current transformer primary current.
c) Operating time $T_h$ at $I_h$ is in the order of 0.4 seconds.
d) The current ratio C is in the order of 1.3.
e) A time grading margin between circuit breakers in a radial potential fault path is Δt=0.4 seconds.

It will be appreciated that 20 times the core balance transformer primary current is large but represents a credible fault current level. In the United Kingdom the earth fault current may be limited to no more than 1,000 amps on an impedance earthed system. In all areas where there is a preponderance of overhead lines which require sensitive earth fault protection, loads are small and protections systems may use core balance transformer currents as low as 50 amps. In such circumstances the prospective earth fault current at twenty times the current transformer primary current would be acceptable.

In the above circumstances the operating time T at 20 times the current transformer current should be in the order of 0.4 seconds as described above which gives a good time margin grading with almost instantaneous earth fault protection.

Figure 4:
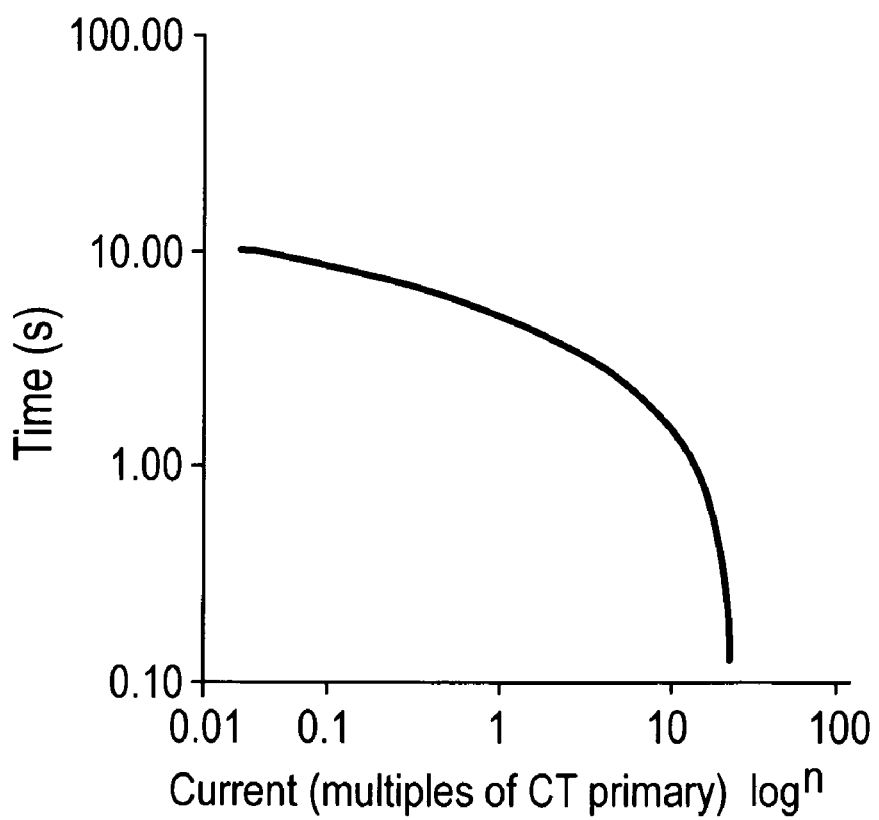
FIG. 4 is a graphic representation of electrical current as multiples of the primary current in a current transformer against time.

FIG. 4 provides an illustration of the inverse current-time logarithmic characteristic utilised to define proportionality and the characteristic of a circuit breaker as utilised in accordance with aspects of the present invention. By choice of appropriate settings in the above expressions practical advantages are provided such as:
a) A circuit breaker protection setting in the order of 0.03 times the current transformer primary current is achieved to give effectively sensitive earth fault protection. It will be understood there is an acceptable compromise between sensitivity to earth faults and insensitivity to current produced by unbalanced phase to earth capacitances and other transients and spurious flows in a power distribution network.
b) An operating time $T_s$ in the order to 10.3 seconds is given. This operating time $T_s$ is an acceptable compromise between satisfactory fast clearance of high resistance earth faults and reasonable immunity to system transients.

Figure 5:
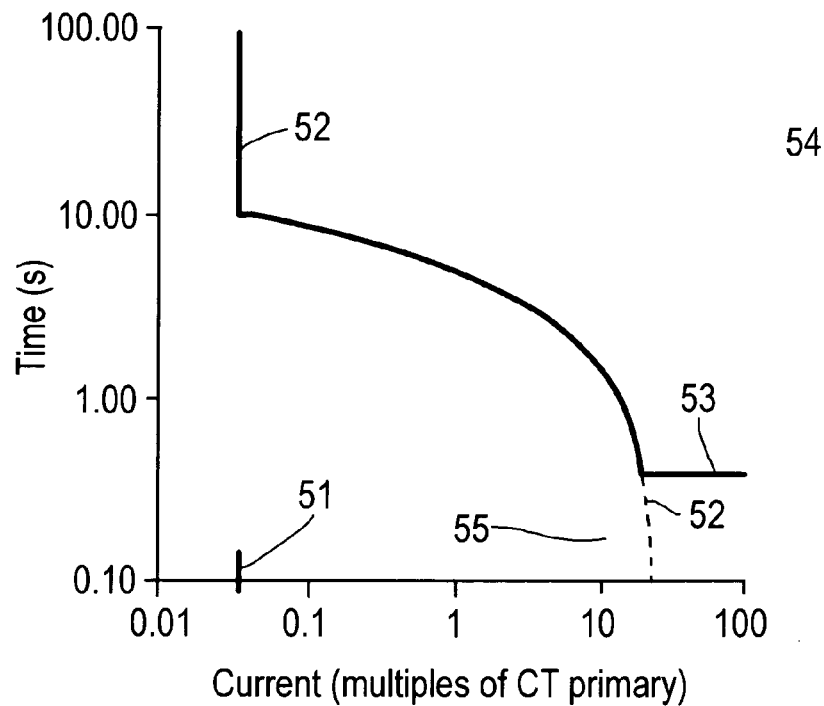
FIG. 5 is a graphic representation of electrical current as multiples of a current transformer primary current.

It will be understood that at high fault currents the operating time T produced by proportionality to an inverse current-time logarithmic function will reduce to zero giving a quasi instantaneous response feature. FIG. 5 provides a graphic representation of such a response. Thus the protection in the form of circuit breakers will not operate until a pickup current 51 is presented to the circuit breaker. Above a fault current multiple of the current transformer current primary illustrated at point 52 the curve defines a definite time 53 for operation of the protection element such as a circuit breaker. This time represents a time period defined to avoid spurious operation of the circuit breaker as a result of system or network transients.

Although operation of an arrangement in such circumstances may be useful in other circumstances operation in accordance with a characteristic response for the time grading margin depicted in FIG. 5 may jeopardise correct grading between the circuit breakers in a power distribution network for protection arrangement operation. A circuit breaker having the characteristic as defined above with regard to FIG. 5 should have a definite minimum time feature that a user can select to override the inverse current-time logarithmic characteristic for the time grading margin. In such circumstances it will be possible to allow the correct time grading for earth fault protection elsewhere within an arrangement.

FIG. 5 provides a definite time feature 53 as indicated overriding the inverse current-time logarithmic characteristic depicted by curve 54. In such circumstances for fault currents greater than at point 52 the definite time feature operates with regard to the circuit breaker. If the inverse logarithmic characteristic depicted by curve 54 is not overridden then part of the characteristic shown by dotted line 55 will prevail giving a quasi instantaneous feature in which the time margin T for operation of the protection arrangement in the form of a circuit breaker is less than the definite time 53.

In accordance with aspects of the present invention generally it is necessary to provide current discrimination. In order to operate properly the inverse current-time logarithmic characteristic defining the time grading margin must have a considerable difference between the fault currents contributed by the various circuits to a fault in use. In particular the fault current contributed by the major contributing circuit should be at least 1.3 times that of other circuits. Although most earth faults and other faults will satisfy this requirement there may be some faults that do not and the latter case must be considered in achieving appropriate operation of a protection arrangement in accordance with aspects of the present invention.

Figure 6:
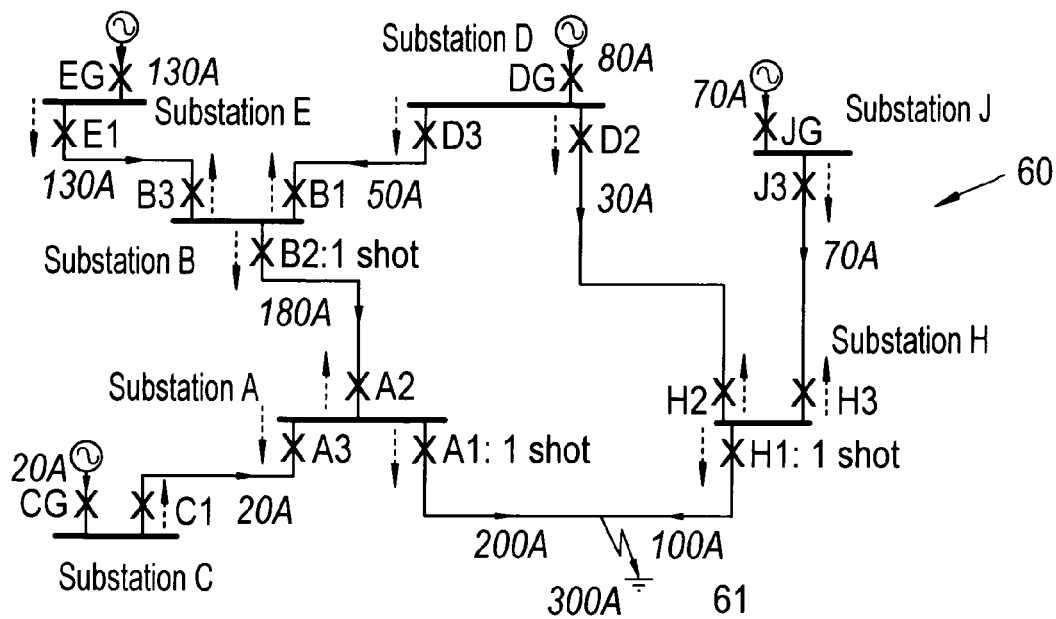
FIG. 6 is a schematic illustration of an earth fault in an electrical power distribution arrangement.

FIG. 6 provides an illustration of a circuit which describes operation of protection arrangements with a fault the arrowheads with a broken shaft illustrate the direction of directional protection elements. In the circuit 60 the consequences of poor current discrimination if almost all the fault current contribution comes from the major contributing circuit are shown. At substations C, D, E and J electrical power generators are provided that contribute respectively earth fault current proportions 20A, 80A, 130A and 170A respectively. There are circuit breakers having protection elements at each substation, and also circuit breakers which control the output from the generators. These circuit breakers are fitted with protection in accordance with aspects of the present invention where their responses to give a time graded margin characteristic which is proportional to an inverse logarithm of (fault electrical current divided by a major contributing electrical current to the circuit breaker). Each circuit breaker (apart from generator circuit breakers) is also associated with a direction protection element which can detect the direction of electrical current flow. If there is a fault between substations A and H this will produce a fault current of 300 amps of which 200 amps flow from substation A and 100 amps flow from substation H. Circuit breaker H1 trips correctly in response to the fault 61. Circuit breaker A1 also trips correctly in response to the 200 amp fault contribution from the substation A to the fault 61. However, it will be understood that the 200 amps contributed to the fault 61 are proportioned such that 180 amps is from substation B. The electrical currents in the fault circuit A to H and the major contributing circuit B to A are nearly the same and so there is a risk that circuit breakers A1 and B2 would trip at the same time. Circuit breaker A1 would correctly disconnect the fault 61 but circuit breaker B2 would have tripped in error. Such an arrangement would possibly be unacceptable in leaving substation A supplied from substation C alone risking overload of a circuit from substation C, or under voltages at substation A.

Solutions to the above problem include as follows:
a) If each circuit breaker in the network 60 is controlled to correspondence with an inverse logarithmic characteristic a solution would be to provide auto re-close for each circuit breaker. Auto re-close is a known protection technique often used to clear transient faults such as those caused by wind blown debris fouling overhead line power networks. When a circuit breaker trips in response to a fault, an auto re-close waits a few seconds, known as the "dead time" for the fault current path to de-ionise before attempting to re-close the circuit breaker to restore supplies. If the fault is still present the circuit breaker will trip again. Often the auto re-closure will deduce that the fault is permanent and lock out the circuit breaker to await repair of the fault and manual restoration of supplies, that is to say re-setting of the circuit breaker. The above described operation is termed single shot auto re-close with the number of shots referring to the number of attempts to re-close. Multi shot auto re-close is possible. Generally with this approach at least one shot at auto re-closure will be applied following a trip of a circuit breaker in accordance with inverse current-time logarithmic characteristics as described above. Such an approach of auto re-close can be termed inverse current-time logarithmic auto re-close and is in addition to instantaneous auto re-close protection which might be applied to disconnect transient faults.

b) Utilising known current flow directional elements it is possible to reduce the unnecessary operation of switch gear. For example, in FIG. 6 although the circuit breaker B2 operates, circuit breaker A2 does not since the flow of fault current through circuit breaker A2 is opposite to the direction of the directional elements fitted to A2. Circuit breaker A2 remains closed and this helps restore supplies.

c) If any circuit breaker at a substation trips in error, then that event is used to operate control circuits which lock out circuit breakers on open circuits to that substation that have tripped correctly.

d) Provision of a known voltage time multiplier feature can be used in order that the operating time is multiplied by a factor proportionate to the voltage of the fault phase voltage. Such an approach will help discrimination as in the example described the voltage of the faulted phase would be higher at substation B than at substation A and this would be used to discriminate and delay operation, that is to say triggering of the circuit breaker B2 and so circuit breaker A1 would operate instead.

Another approach to solving the problem of poor current discrimination is to "lock-out" the auto-reclose function of protection in response to the measurement of current through neighbouring or adjacent circuit breakers.

Figure 7:
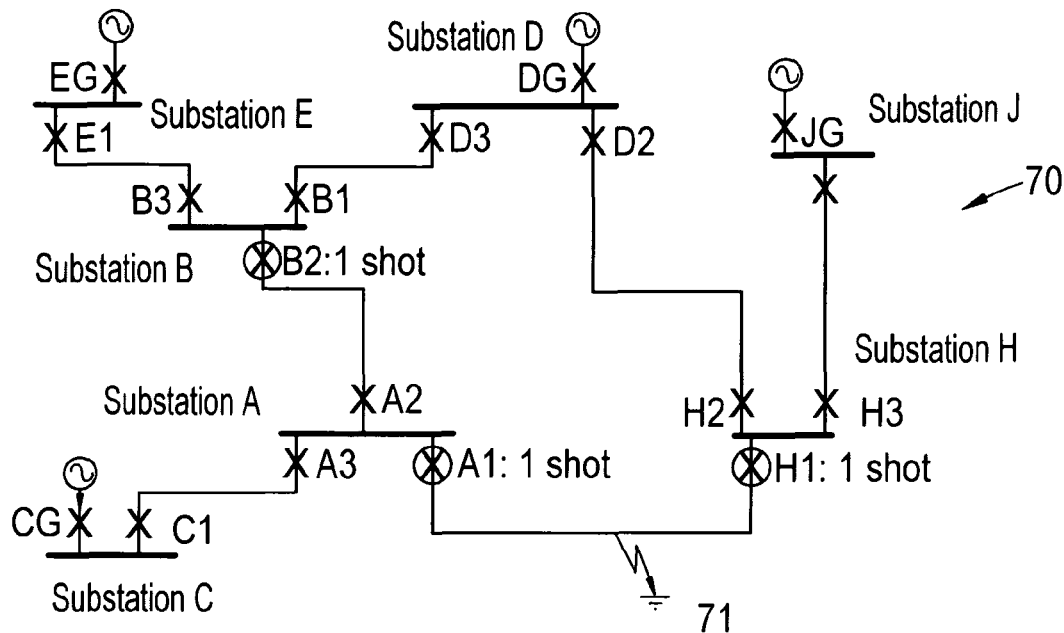
FIG. 7 illustrates a power distribution arrangement in operation with a protection arrangement in accordance with first aspects of the present invention.

The above approaches are described below with regard to FIG. 7. A fault 71 is presented within the electrical power distribution network 70. The fault 71 is between substations A and H and produces a distribution of fault current which can cause correct operation of circuit breakers A1 and H1 so disconnecting the faulted circuit between substations A and H. However, since the fault currents through the circuit breakers B2 and A1 are similar, B2 trips at about the same time as A2. Such a situation would be an incorrect operation and causes unnecessary disconnection of parts of the circuit between the substations B and A when such parts are operating correctly. Thus, circuit breakers H1 and A1 open in an attempt to clear the fault 71 but circuit breaker B2 will also operate in error since the fault current through B2 is nearly the same as through A1.

In the above circumstances load current will flow through circuit breaker A2 but as circuit breaker B2 has operated and been triggered then no electrical current flows through A2. The electrical current through A2 is measured during the dead time of the circuit breaker A1 and the absence of electrical current is used to lock out A1. Such locking of circuit breaker A1 will prevent A1 from auto re-closing.

Figure 8:
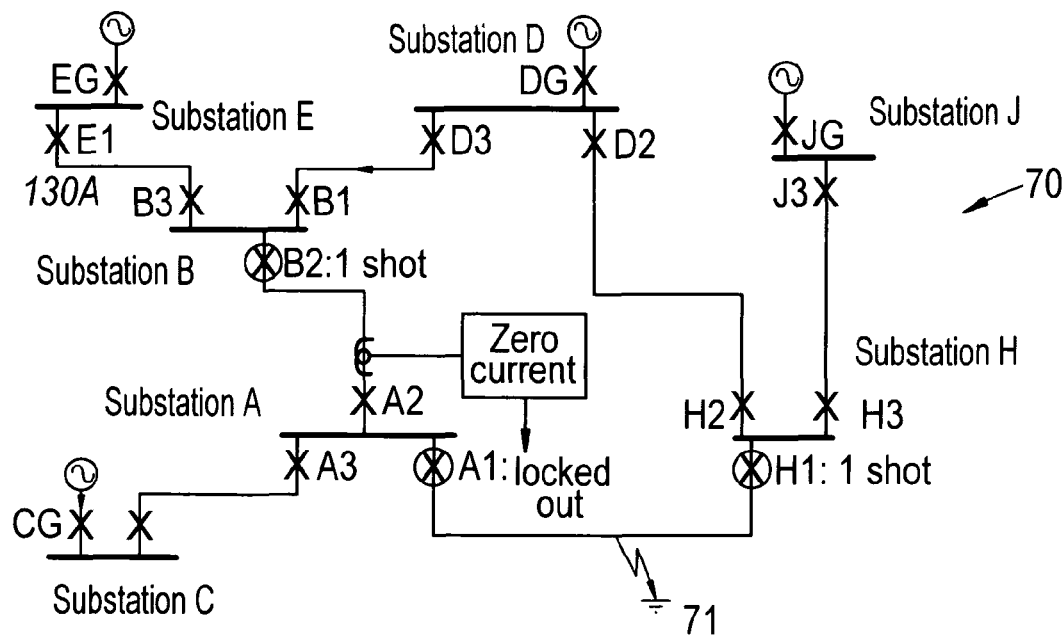
FIG. 8 is a circuit illustrating operation of a protection arrangement in accordance with a second aspect of the present invention.

FIG. 8 illustrates operation of a protection arrangement in accordance with a second aspect of the present invention. FIG. 8 shows the state of the switch gear to cater for the configuration as depicted by operation in accordance with a first aspect as depicted in FIG. 7. To cater for isolation and outage of electrical power distribution to the circuit between circuit breaker B2 and circuit breaker A2 which would also cause a zero current flow through A2, circuit breaker A1 is locked out if there has been a current flowing in circuit breaker A2 just before circuit breaker A1 is tripped in accordance with the time grading margin characteristic as described above.

During the dead time of circuit breaker B2 and circuit breaker A1 the protection arrangement detects no electrical load in the circuit between substation B and substation A. The protection arrangement in such circumstances will be configured such that circuit breaker B2 has operated in error due to poor electrical current discrimination and reduces by one the number of auto re-closure shots for circuit breaker A1.

Figure 9:
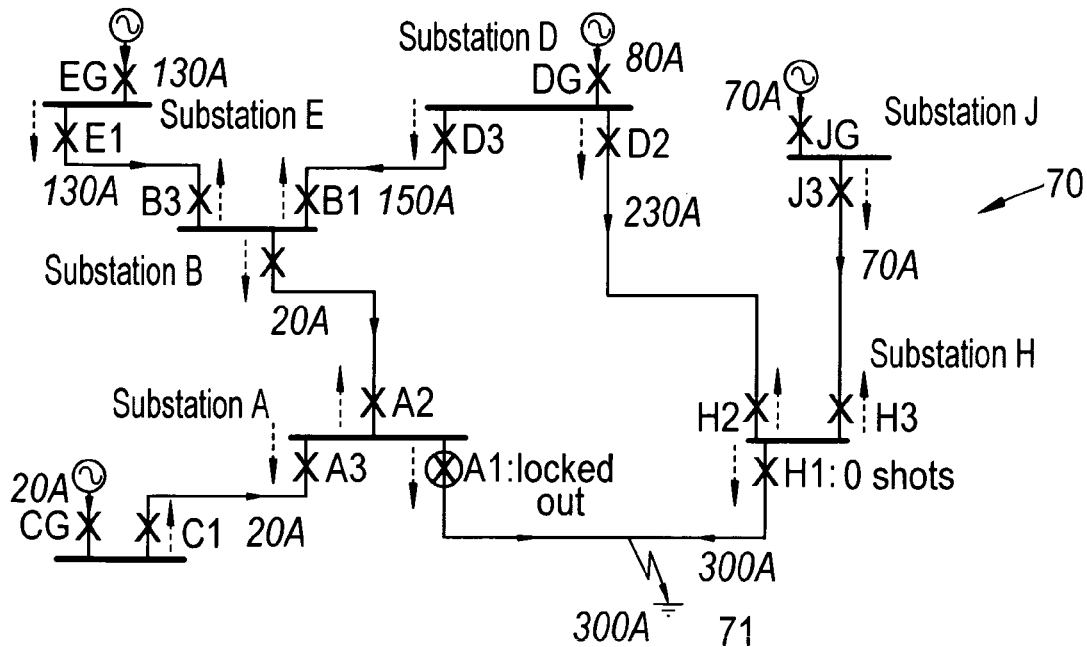
FIG. 9 is a circuit illustrating operation of a protection arrangement in accordance with a third aspect of the present invention.

After tripping circuit breakers A1 and B2 re-close after their respective dead time to allow for de-ionisation. FIG. 9 provides operation of a protection arrangement in accordance with a third aspect of the present invention. The operating states of the switch gear and the number of auto re-closure shots remaining following re-closure are illustrated.

Figure 10:
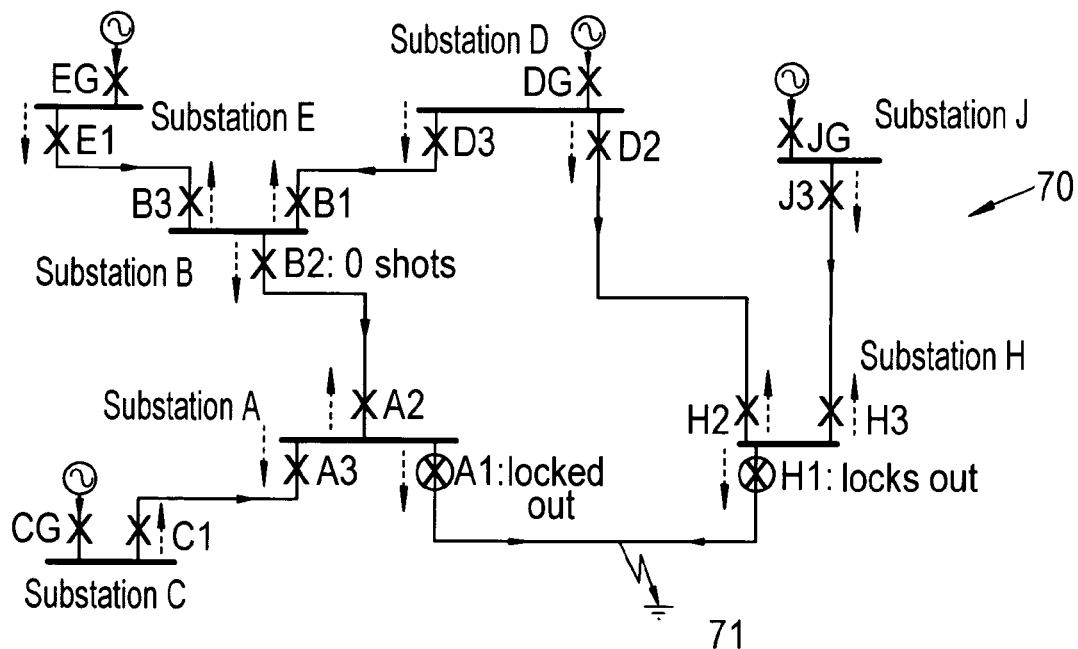
FIG. 10 is a circuit illustrating operation of a protection arrangement in an electrical power distribution circuit in accordance with fourth aspects of the present invention.

Circuit breaker H1 and circuit breaker B2 auto re-close. Circuit breaker A1 as illustrated has been locked out and cannot re-close. If the fault 71 between substations A and H is permanent, circuit breaker H1 trips as previously. If the fault 71 between substations A and H remains following re-closure of circuit breaker H1 then circuit breaker H1 trips again and locks out disconnecting the fault 71 from substation H. FIG. 10 illustrates the consequential state of the switch gear for a protection arrangement in accordance with the fourth aspect of the present invention. The circuit breaker H1 opens to clear the fault 71 and subsequently locks out. As will be recalled circuit breaker A1 is already locked out. After a short period of time typically referred to as the "re-set (or re-claim) time", normally in the order of 30 seconds, the protection arrangement will re-set circuit breaker B2 back to a single shot re-closure condition.

Figure 11:
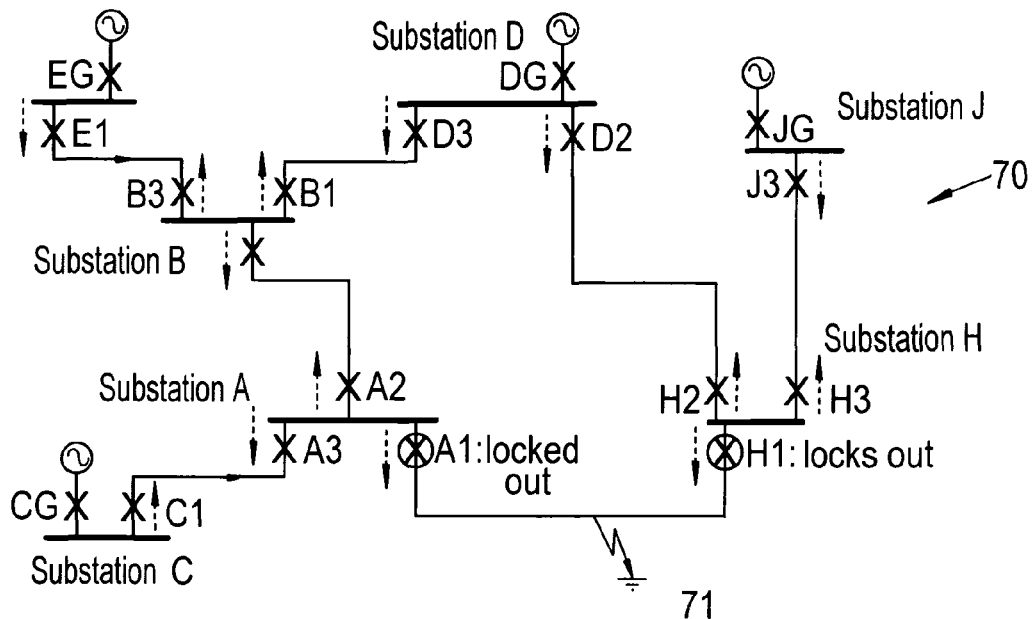
FIG. 11 is a circuit illustrating operation of a protection arrangement in accordance with fifth aspects of the present invention; and, FIG. 12 is a circuit illustrating operation of a protection arrangement in accordance with a sixth aspect of the present invention.

FIG. 11 provides an illustration with regard to the final state of the switch gear in the protection arrangement for a distribution network 70 in accordance with fifth aspects of the present invention. The circuit breaker H1 opens to clear the fault 71 and locks out. As indicated previously circuit breaker A1 is already locked out. However, the fault 71 is between substations A and H and is transient and therefore circuit breaker H1 re-closes successfully whereupon there is voltage on the circuit side of circuit breaker A1. Such voltage can be measured at substation A and is used to control auto re-closure and lock out of circuit breaker A1 so that circuit breaker A1 re-closes, restoring the circuit between circuit breaker A1 and circuit breaker H1 to service.

Figure 12:
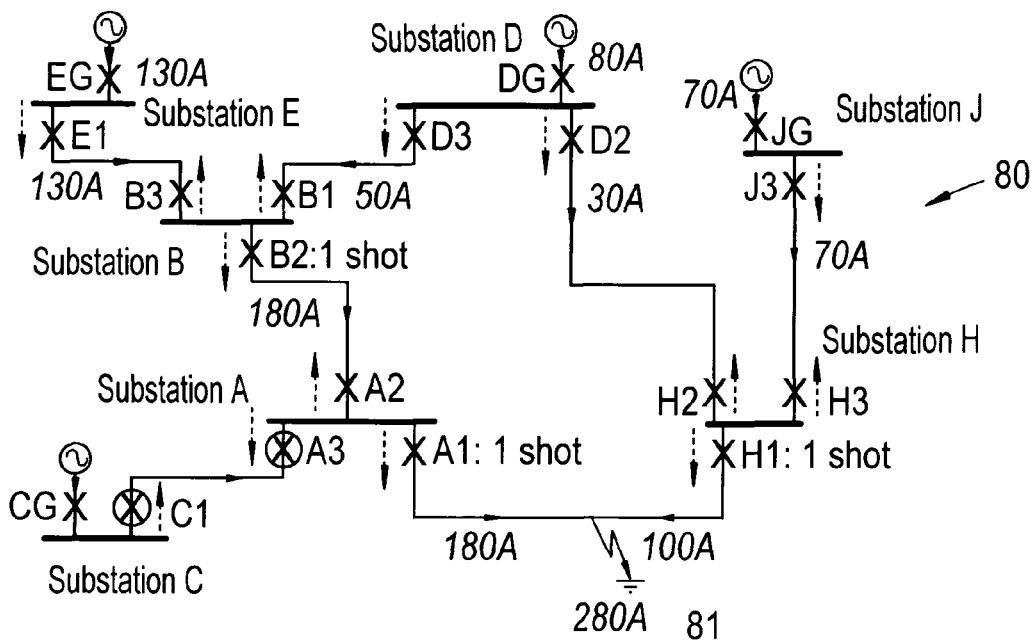

It will be understood that protection arrangements must consider the consequences of electrical power disconnection or outages. Outages may be regarded as causing the most extreme form of poor electrical current discrimination in which the fault current is the major contributing circuit and in such circumstances it is the same as that of the faulted circuit. FIG. 12 illustrates the consequences of a fault 81 in a power distribution network 80 between substations A and H as previously but also with an outage or fault in the circuit between substations C and A. The fault current flow through the circuit breakers A1 and B2 would be exactly the same leading to a sequence of protection operations similar to that described above with regard to operation of network 70 with regard to fault 71 occur.

The circuit breakers H1 and A1 open to clear the fault 81. Circuit breaker B2 is also operated in error since the fault current through circuit breaker B2 is exactly the same as that through circuit breaker A1.

All circuit breakers in the network 80 will utilise inverse current-time logarithmic characteristics in order to define a time grading margin. The inverse current-time logarithmic characteristic will require a single shot inverse current-time logarithmic auto re-closure to cater for poor current discrimination or circuit outages. However, use of a single shot inverse current-time logarithmic auto re-closure causes a permanent fault to suffer two passages of fault current in quick succession. This may lead to more damage at the site of the fault 81 than if the fault 81 is disconnected through a single inverse current-time logarithmic trip of appropriate circuit breakers.

Inverse current-time logarithmic auto re-closure may be avoided by using communication between substations to signal that a circuit breaker has tripped in error. However, if such communication is available, it would be better employed providing directional or protection zone/unit protection in the network 80.

An alternative is to use only inverse current-time logarithmic auto re-closure if the protected circuit is unfaulted. For example in FIG. 6 and FIG. 7 the circuit between substations A and B is unfaulted and energised by substation C via substation A. There is a voltage on the circuit side of circuit breaker B2 and so one criteria for inverse current-time logarithmic auto re-closure is to re-close only if there is satisfactory voltage on the circuit side of the circuit breaker in question.

By the above approach the requirement for triggering may be extended to include known "check synchronising" protection. Thus, inverse current-time logarithmic auto re-closure is only permitted if the voltage on both sides of an open circuit breaker are within acceptable limits of voltage and frequency and are also within accepted limits of phase. Such further requirements when sure of closure of the circuit breaker in question may not cause an out of phase reconnection of two or more power systems. Distribution systems containing distributed generation are likely to require check synchronising protection of circuit breakers fitted with auto re-closure features.

Check synchronising may not work during outages or disconnections. For example, it may be as illustrated with regard to FIG. 12 that a fault 81 between substations A and H but not coincident with an outage of the circuit between substation C and A. In such circumstances the circuit breakers A1, H1 and B1 would trip and the whole of the substation would lose supply. The circuit between circuit breaker H2 and B2 is then also isolated. However, the circuit could be used to send a signal from substation A to substation B indicating the circuit is unfaulted and that the circuit breaker B2 may close. If voltage transformers are installed on the circuit side of circuit breakers A2 and B2 for check synchronising or otherwise these may be used to inject a low power signal (provided circuit breaker A2 is opened first). In such circumstances safety would require the low power signal to be disconnected before the circuit is re-energised.

It is possible to incorporate inverse current-time logarithmic characteristics for the time grading margin in protection systems employing instantaneous auto re-closure.

The purpose of instantaneous auto re-closure is to improve the quality of electrical power supply. Instantaneous auto re-closure relies upon most faults on overhead lines being transient for example wind blown debris making brief contact with phase conductors or conductors clashing. In many cases, disconnection using instantaneous protection followed by re-closure after a dead time of several seconds to allow for the fault path to de-ionise or clear the fault will be efficient. Using instantaneous protection, rather than time delay protection, limits the damage at the fault so improving the likelihood of successful re-closure. Most auto re-closure systems are single shot, that is to say an instantaneous trip followed by a re-closure and then a time delay trip if the fault remains. Multi shot instantaneous auto re-closure is sometimes employed for various purposes.

With regard to operation of instantaneous auto re-closure it will be understood following a fault an earth fault current flows in all circuits and in most cases will operate instantaneous earth fault protection arrangements controlling auto re-closure. In such circumstances a single fault on an interconnected system of the distribution network utilising auto re-closure may trip many circuits causing loss of supply over a wide area during the dead time of the auto re-closure. Applying known directional features to the protection arrangement helps discrimination and reduces the unnecessary operation of switch gear. The protection arrangement in such circumstances is directional and so only operates for electrical fault currents in the same direction as the dotted lines in the figures depicted above.

If a fault remains following an auto re-closure then the fault current will continue to flow. The inverse current-time logarithmic characteristic in such circumstances is to ensure that the fault is disconnected in a discriminative manner. However this relies upon the fault current in the faulted circuit being much greater than the contributing circuits. If the faulted current re-closes before all of the contributing circuits then the first contributing circuit to re-close will carry the same current as the faulted circuit and both will trip. Ideally all circuits should be re-closed at the same time but timing errors and variations in the operating time of individual switch gears such as circuit breakers will render such instantaneous re-closure as practically impossible.

In view of the above an objective will be to provide staged re-closings starting with the more distant circuits and ending with the circuits nearest to the fault so that all the contributing circuits are restored to service before the re-closure onto the faulted circuit. Principles with regard to current isolation can be used to achieve this. The dead time is made dependent upon the fault current that causes the trip whether that be instantaneous or inverse current-time logarithmic time delayed by the time graded margin as described above. The higher the fault current, the longer the dead time. Such an approach would achieve an objective of staged re-closure by ensuring that the circuits which carry the smallest fault currents due to their remoteness from the fault will re-close earlier than circuits which carry the larger fault currents as they are nearer to the fault. It will be understood that this principle relates to the cascade or branching proportioning of the fault current throughout the distribution network or mesh away from the site of the fault.

A suitable "dead time" characteristic would be proportional to the inverse current-time logarithmic characteristic as described above in expressions (4) and (5) and can be expressed by expression (6) below:

$$T_d = T_{do} \frac{\Delta t_a}{l_n C_A} l_n \left( \frac{I_f}{I_A} \right) \quad \text{Expression (6)}$$

wherein:

$I_a$ is the current setting of instantaneous protection used to control auto re-closure $I_f$ is the fault current $T_{do}$ is the minimum dead time required to de-ionise the fault path $T_d$ is the dead time $C_a$ is the current ratio between the fault current and the major contributing current $\Delta t_a$ is the time grading margin As indicated $C_a$ and $\Delta t_a$ relate to auto re-closure and need not be the same as corresponding quantities in the inverse current-time logarithmic protection tripping characteristic as described previously.

The dead time characteristic gives a dead time that increases with increasing fault current. The dependence of dead time on fault current may offer faster restoration of supplies since small fault currents may not need a lengthy fixed dead time of five to ten seconds presently used to de-ionise the fault path. However, it is likely that there will be a minimum dead time $T_{do}$ required to de-ionise a fault path regardless of fault current. The minimum dead time $T_{do}$ may be determined from theoretical analysis and confirmed by laboratory tests or other empirical experience.

A further advantage with regard to staged re-closure is that such an approach will avoid undue transients produced by the sudden reconnection of relatively large electrical loads. Such an approach would be of particular importance with respect to small electrical systems vulnerable to voltage transients. Extending this feature further it may be possible to provide a delay to the closure until electrical systems are operating stably. A suitable strategy would be to wait until the voltage and frequency are within statutory limits and then start the dead time characteristic as described above.

Generally an inverse current-time logarithmic protection system would comprise an instantaneous trip followed by a re-closure after a dead time dependent upon fault current. If the fault persists, the protection arrangement would trip according to the inverse current-time logarithmic characteristic followed by a single shot auto re-closure as described previously. If the fault still persists then the protection arrangement would lock the respective circuit breakers to isolate the proportion of the circuit between circuit breakers which define a protection zone in which the fault occurs. Furthermore, inverse current-time logarithmic auto re-closure would be controlled by check synchronising of respective triggers for circuit breakers.

It will be appreciated that the protection arrangement in accordance with aspects of the present invention need only make measurements of electrical current. The protection arrangement does not need to measure voltage and does not require communication with remote locations although as indicated above with respect to coordination such features may be advantageous.

Aspects of the present invention in terms of inverse current-time logarithmic protection characteristic in order to define the time grading margin may be applied to over current protection arrangements. The inverse current-time logarithmic protection characteristic may be applied to the time current grading of over current protection and earth fault protection of radial electrical distribution systems as well as meshed or grid electrical distribution networks. Extending aspects of the present invention to provide protection characteristics with regard to operating time for individual or groups of circuit breakers by consideration of the relationship between operating time and fault current setting, high current setting, high current operating time, current ratio and time grading margin will enable further adaptation of a protection arrangement and procedures in accordance with aspects of the present invention.

With regard to a voltage time multiplier it will be understood that operational performance can be related to operating time in proportion to the network voltage and provides useful features with regard to ensuring that a circuit breaker closer to a fault operates faster than those more distant and therefore improves operation. Such multipliers act contrary to the inherent fault depression of voltage and therefore a depression in this voltage at positions within a network closer to the fault may be utilised as a control feature.

Further in accordance with aspects of the present invention a voltage controlled over current protection can be achieved. Such protection is based upon prior art voltage controlled over current protection in which F(v), the mathematical function of system voltage=1 when the system voltage is above 80% of normal and equals 0.4 when the system voltage is below 80% of nominal. The values for voltage control over current protection and timings can be adjusted dependent upon requirements.

A further adaptation of aspects of the present invention is to provide a voltage restrained over current protection. With this approach voltage restrained over current is utilised as a control feature wherein the function of the trigger current to voltage is given by the relationship $$f_{is} = K_{is} \cdot V F(v) = KV \qquad \text{Expression (7)}$$

where K is a constant of proportionality multiplied by the voltage. This function will give an operating performance in which the operating time is proportional to the system voltage and therefore provides a useful feature to ensure correct operation if the prospective fault current is low. Such an approach may occur if the source of electrical current supplied to the faulted system has current limiting features. It will also be understood that similar voltage functions can be applied to the dead time characteristic as described above. The inverse current-time logarithmic protection characteristic utilised in order to provide the time grading margin may be combined with protection signals for remote locations in order to again provide further sophistication with regard to tripping of individual circuit breakers. Signals could include inter tripping or several circuit breakers, blocking of circuit breakers in combination and acceleration dependent upon known factors.

The inverse current-time logarithmic protection arrangement as described above has particular applicability with regard to land based utility electrical distribution networks. However, the protection arrangement and method of operating a protection arrangement can also be utilised in other electrical distribution networks in a contained environment such as with regard to a vehicle eg ship or aircraft.

Inverse current-time logarithmic protection characteristics in arrangements and methods of operation can be developed with alternating current systems in mind but could also be utilised with the direct currents and in such circumstances transducers will be used instead of current transformers. For example Hall effect transducers could be applied to measure direct currents in positive and negative conductors and measure earth fault currents by combining these measurements. A Hall effect transducer encloses both positive and negative conductors and the Hall effect transducer will respond to a magnetic field around the conductors and measurements of the earth fault current directly. Furthermore, a Hall effect transducer, which encloses each conductor separately will enable earth fault current to be determined from the difference between the measurements.

Modifications and alterations to aspects of the present invention as described above will be understood by a person skilled in the technology. For example, adaptability with regard to the inverse current-time logarithmic characteristic to determine the time grading margin may be provided dependent upon operational circumstances. Thus the constant G may be adjusted dependent upon loadings within the electrical power distribution network.

The invention claimed is:

1. A protection arrangement for an electrical power distribution network, the protection arrangement comprising:
a plurality of circuit breakers arranged at junctions within the distribution network, wherein
at least one of the plurality of circuit breakers is arranged to trip with a time grading margin proportional to a logarithm of a fault electrical current divided by a major contributory current presented to the at least one of the plurality of circuit breakers, and
the time grading margin is given by the expression $\Delta t = G \ln (I_f \div I_m)$, where $\Delta t$=the time grading margin, G is a grading constant, $I_f$ is the fault current and $I_m$ is the major contributing current.

2. An arrangement as claimed in claim 1 wherein the time grading constant is variable and/or adjustable dependent upon operational requirements.

3. An arrangement as claimed in claim 1 wherein a minimum time delay is provided with regard to operation of a respective one of the plurality of circuit breakers.

4. An arrangement as claimed in claim 3 wherein the minimum time delay is to avoid excessive damage to the electrical power distribution network.

5. An arrangement as claimed in claim 3 wherein the minimum time delay is determined relative to a high fault current value.

6. An arrangement as claimed in claim 1 wherein a maximum operating time for the at least one of the plurality of circuit breakers is determined relative to a minimum fault current to avoid spurious operation of the at least one of the plurality of circuit breakers due to transient values, and to allow a circuit breaker with the minimum operating time to operate in response to nearby faults instead of other circuit breakers.

7. An arrangement as claimed in claim 1 wherein the at least one of the plurality of circuit breakers incorporates auto re-closure.

8. An arrangement as claimed in claim 1 wherein the plurality of circuit breakers within the electric power distribution network are arranged such that circuit breakers in a radial sequence through the electrical power distribution network are graded such that a current setting of an upstream protective device is at least 1.3 times that of a current setting of a protective device immediately downstream.

9. An arrangement as claimed in claim 1 wherein any auto re-closure is a single one shot auto re-closure or a multiple shot auto re-closure.

10. An arrangement as claimed in claim 1 wherein a controller is provided to control operation of the plurality of circuit breakers.

11. An arrangement as claimed in claim 10 wherein the plurality of circuit breakers incorporate signal pathways to the controller to allow determination of status by the controller.

12. An arrangement as claimed in claim 10 wherein the controller is configured to set the plurality of circuit breakers for re-closure.

13. An arrangement as claimed in claim 1, wherein the electrical power distribution network is configured in a mesh of interconnected generators and loads.

14. A method of operating a protection arrangement for an electrical power distribution network, the method comprising:
configuring a plurality of circuit breaker elements at junctions within the distribution arrangement;
arranging for at least one of the plurality of circuit breaker elements to trip with a time grading margin proportional to a logarithm of a fault electrical current divided by a major contributory current presented to the at least one of the plurality of circuit breaker elements, wherein
the time grading margin is given by the expression $\Delta t = G \ln (I_f \div I_m)$, where $\Delta t$=the time grading margin, G is a time grading constant, $I_f$ is the fault current and $I_m$ is the major contributing current.

15. A method as claimed in claim 14 wherein the time grading constant is variable and/or adjustable depending upon operational requirements.

16. A method as claimed in claim 14 wherein a minimum time delay is provided with regard to operation of a respective circuit breaker element.

17. A method as claimed in claim 14 wherein a minimum time delay is to avoid excessive damage to the electrical power distribution network.

18. A method as claimed in claim 14 wherein a minimum time delay is determined relative to a high fault current value.

19. A method as claimed in claim 14 wherein a maximum operating time for the at least one of the plurality of circuit breaker elements is determined relative to a minimum fault current to avoid spurious operation of the at least one of the plurality of circuit breaker elements due to transient values.

20. A method as claimed in claim 14 wherein any auto re-closure is a single one shot auto re-closure or a multiple shot auto re-closure.

21. A method as claimed in claim 14 wherein the electrical power distribution network is configured in a mesh of interconnected generators and loads.

* * * * *